(No Model.) 2 Sheets—Sheet 1.
T., F. & E. WARWICK.
PEDAL FOR VELOCIPEDES.
No. 514,742. Patented Feb. 13, 1894.
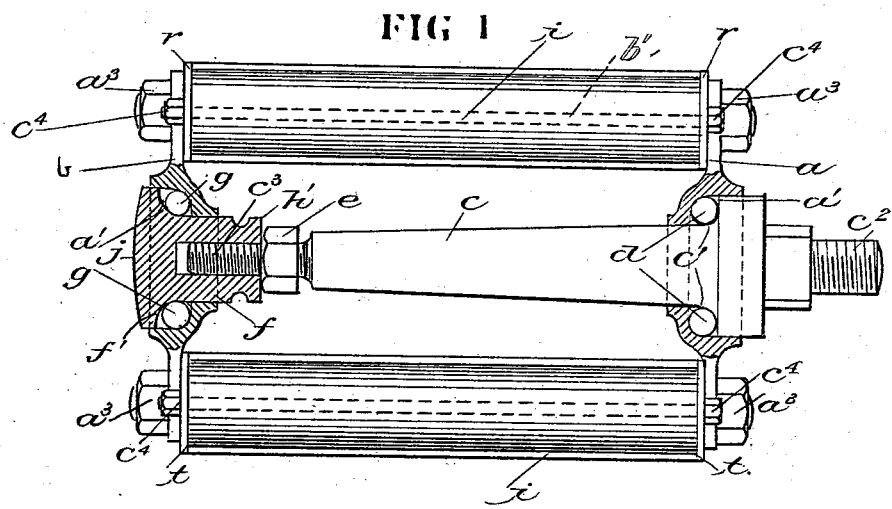
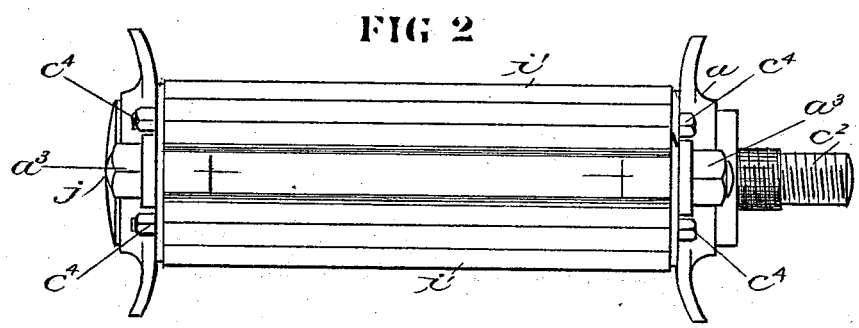
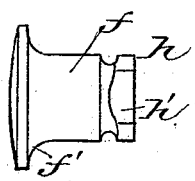
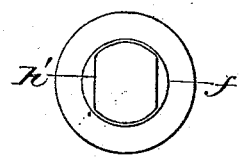
WITNESSES.
Isaac Marks.
Thomas Ryan.
Inventors
Thomas Warwick
Frederick Warwick
Edward Warwick
Per Alfred W. Turner
Attorney (No Model.) 2 Sheets—Sheet 2.
T., F. & E. WARWICK.
PEDAL FOR VELOCIPEDES.
No. 514,742. Patented Feb. 13, 1894.
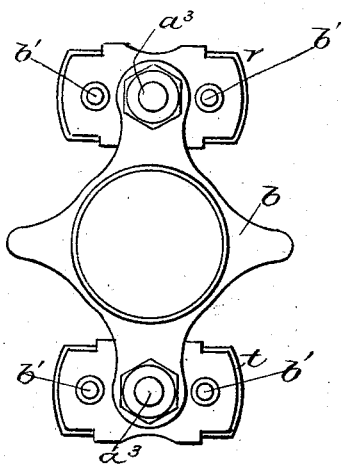
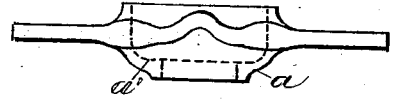
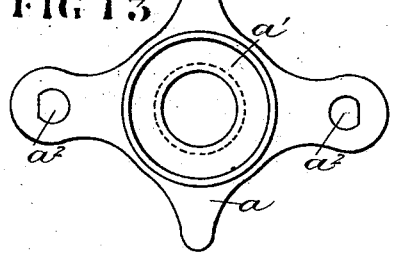
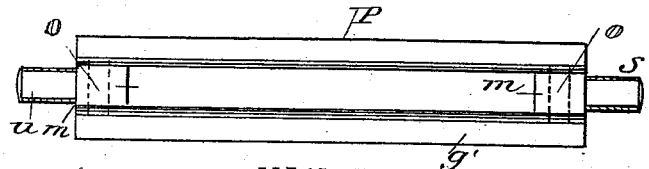
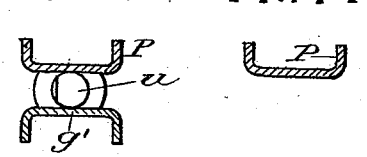
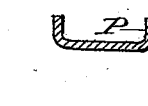
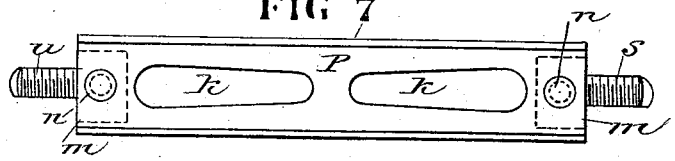
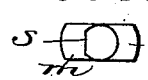
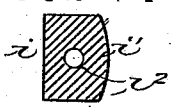
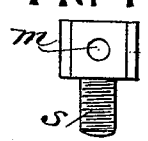
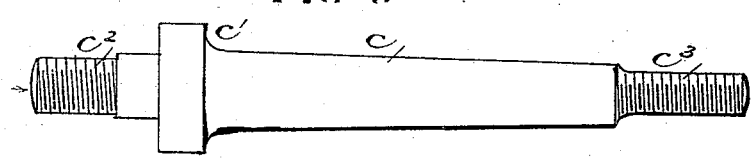
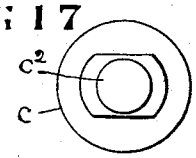
WITNESSES.
Isaac Marks
Thomas Ryan
Inventors
Thomas Warwick
Frederick Warwick
Edward Warwick
per Agnes W Turner
Attorney
THE NATIONAL LITHOGRAPHING COMPANY,
WASHINGTON, D. C.

United States Patent Office.

THOMAS WARWICK, FREDERICK WARWICK, AND EDWARD WARWICK, OF BIRMINGHAM, ENGLAND.

PEDAL FOR VELOCIPEDES.

SPECIFICATION forming part of Letters Patent No. 514,742, dated February 13, 1894.

Application filed July 30, 1892. Serial No. 441,768. (No model.) Patented in England April 8, 1891, No. 6,036.

*To all whom it may concern:*

Be it known that we, THOMAS WARWICK, FREDERICK WARWICK, and EDWARD WARWICK, subjects of Her Majesty the Queen of England, residing at Aston, Birmingham, in the county of Warwick, England, have jointly invented certain new and useful Improvements in Pedals for Velocipedes, (for which we obtained a patent in Great Britain, No. 6,036, dated April 8, 1891,) of which improvements the following is a specification.

The principal object of our invention is to provide a neat, efficient, durable and comparatively inexpensive pedal for velocipedes.

Our invention consists of the improvements hereinafter described and claimed.

The nature, characteristic features and scope of our invention will be more fully understood from the following description taken in connection with the accompanying drawings forming part hereof; and in which—

Figure 1, is a top or plan view partly in section of a pedal embodying features of our invention. Fig. 2, is a side elevational view of the pedal shown in Fig. 1. Figs. 3 and 4, are respectively side and end views of the cap that secures the pedal to place upon its spindle. Fig. 5, is an elevational view of the left hand end of the pedal illustrated in Fig. 1. Figs. 6 and 7, are respectively a top and plan view of one of the fender-plates for supporting the rubber treads, showing also the distance-pieces to which the fender-plates are riveted. Figs. 8 and 11, are respectively a top and a transverse sectional view of one of the rubber treads, showing the same provided with a convex working face. Fig. 9, is a detached view of the fixed spindle that supports the pedal. Fig. 10, is a view of the left hand side of Fig. 6. Figs. 12 and 13, are views illustrating one of the side cheeks. Fig. 14, is a detached view of one of the fender-plates. Figs. 15 and 16, are respectively a plan and an end view of one of the distance pieces; and Fig. 17, is an end view of Fig. 9, taken in the direction indicated by the arrow.

In the drawings $a$ and $b$, are side cheeks provided respectively with grooves $a'$, for the accommodation of the sets $d$ and $g$ of balls.

$c$, is a spindle provided at its inner extremity with a groove $c'$, for the accommodation of the set $d$ of balls, and with a tapped portion $c^2$, whereby it may be rigidly attached to a crank-arm, not shown. The other extremity of this spindle is threaded as at $c^3$, for the reception of a lock or jam-nut $e$, and of an internally threaded or tapped cap $f$, which latter is provided with a groove $f'$, for the accommodation of the set $g$, of balls. This cap $f$, is screwed onto the end $c^3$, of the spindle $c$, until both sets $d$ and $g$, of balls are adjusted to an easy bearing, whereupon the lock or jam-nut $e$, is tightened against the face $h$, of the cap $f$. This cap $f$, may be squared up as at $h'$, for the reception of a wrench, whereby this tightening operation may be accomplished. By these means an efficient ball bearing pedal is afforded without the employment of the unsightly nut that usually projects therefrom as at $j$, into position for being caught by the clothing of the rider.

P and $g'$, are two channeled fender-plates adapted for the reception of rubbers $i$, having convex faces $i'$, and provided with longitudinally ranging openings $i^2$. These fender-plates P and $g'$, may be cut out as at $k$, in order to diminish their weight without materially affecting their strength, and are provided with apertures $n$, for a purpose to be presently described.

$m$, are distance pieces secured to the fender plates P and $g'$, by means of rivets $o$, and provided with flat sided shanks $s$ and $u$, Fig. 15.

$r$ and $t$, are end-plates provided respectively with central apertures snugly fitting the flat sided shanks $s$ and $u$, of the distance-pieces $m$, and with apertures through which tie-rods $b'$ pass. These tie-rods $b'$, also pass through the openings $i^2$, in the rubbers $i$, and are clamped to place by nuts $c^4$.

The rubbers $i$, fender-plates P and $g'$, end plates $r$ and $t$, and their accessories, constitute foot blocks and are rigidly secured to the side cheeks $a$ and $b$, by providing the latter with apertures $a^2$, adapted to snugly engage the flat sided shanks $s$ and $u$, of the distance-pieces $m$, and then screwing the nuts $a^3$, to place on said shanks, so that the hereinabove described pedal is provided upon its respective faces with convex rubbers and consequently the foot of the rider may be placed upon either side thereof, or, in other words, the foot block is reversible.

Having thus described the nature and objects of our invention, what we claim as new, and desire to secure by Letters Patent, is—

1. A pedal comprising a foot block provided with side cheeks, rigidly connected together a spindle penetrating one of said cheeks and provided with a threaded extremity, a cap penetrating the other of said cheeks and engaging the threaded extremity of said spindle at a point intermediate of the side cheeks and provided with a square face for the reception of a wrench, and a jam-nut for locking said cap, substantially as and for the purposes set forth.

2. In a pedal, a foot block comprising cheek and end plates having flat sided apertures, distance-pieces having flat sided shanks snugly fitting said apertures and bolted to said plates, channeled fender-plates secured to opposite sides of the distance-pieces, and rubbers carried in said channeled fender-plates by tie-rods attached to the end plates, substantially as and for the purposes set forth.

3. In a pedal, channeled fender-plates mounted upon distance-pieces provided with shanks engaging end plates and rubbers located in said channeled plates and mounted upon rods bolted to the end-plates, substantially as and for the purposes set forth.

4. In a pedal, channeled fender-plates adapted to the reception of rubbers and distance-pieces, secured to and interposed between the respective extremities of said plates substantially as and for the purposes set forth.

5. In a pedal, channeled fender-plates secured to distance-pieces provided with flat sided shanks engaging apertures in end plates, and rubbers having convex faces and mounted on tie-rods ranging transversely of the channeled plates and attached to the end plates, substantially as and for the purposes set forth.

6. A pedal comprising cheek and end plates having flat sided apertures, distance-pieces having flat sided shanks snugly fitting said apertures and bolted to said plates, channeled fender-plates secured to opposite sides of the distance-pieces, rubbers carried in said channeled fender-plates by tie-rods bolted to the end-plates, a spindle penetrating one of said cheek-plates and provided with a threaded extremity, a cap penetrating the other of said cheek plates and engaging the threaded extremity of said spindle, and a jam-nut for locking said cap, substantially as and for the purposes set forth.

In testimony whereof we have hereunto signed our names in the presence of two subscribing witnesses.

THOMAS WARWICK.
   FREDERICK WARWICK.
   EDWARD WARWICK.

Witnesses:
 A. W. TURNER,
 ISAAC MARKS.